United States Patent
Yoerger et al.

(10) Patent No.: US 6,946,650 B2
(45) Date of Patent: Sep. 20, 2005

(54) SENSOR

(75) Inventors: Dana R. Yoerger, North Falmouth, MA (US); David K. Nergaard, Littleton, MA (US); Albert M. Bradley, North Falmouth, MA (US)

(73) Assignee: Independence Technology, L.L.C., Warren, NJ (US)

( * ) Notice: Subject to any disclaimer, the term of this patent is extended or adjusted under 35 U.S.C. 154(b) by 254 days.

(21) Appl. No.: 10/375,449

(22) Filed: Feb. 27, 2003

(65) Prior Publication Data

US 2004/0016875 A1 Jan. 29, 2004

Related U.S. Application Data

(60) Provisional application No. 60/361,820, filed on Mar. 4, 2002.

(51) Int. Cl.$^7$ ................................................. G01D 5/34
(52) U.S. Cl. ........................... 250/231.18; 250/231.14; 250/226; 250/578.1; 356/419; 356/420
(58) Field of Search ................. 250/231.13, 226, 250/578.1, 231.18, 231.14; 356/402, 414, 416–420; 341/21; 297/132; 359/233–236; 435/455, 469

(56) References Cited

U.S. PATENT DOCUMENTS

| | | |
|---|---|---|
| 4,050,533 A | 9/1977 | Seamone |
| 4,116,157 A | 9/1978 | Evans |
| 4,125,169 A | 11/1978 | Harris et al. |
| 4,339,013 A | 7/1982 | Weigt |
| 4,415,049 A | 11/1983 | Wereb |
| 4,422,515 A | 12/1983 | Loveless |
| 4,627,860 A | 12/1986 | Rowland |
| 4,634,941 A | 1/1987 | Klimo |
| 4,667,136 A | 5/1987 | Bell |
| 4,767,940 A | 8/1988 | Tuttle |
| 4,914,437 A * | 4/1990 | Kibrick et al. ................ 341/3 |
| 4,947,036 A | 8/1990 | Pokorski et al. |
| 5,024,286 A | 6/1991 | Lean et al. |
| 5,033,000 A | 7/1991 | Littlejohn et al. |
| 5,113,959 A | 5/1992 | Mastov et al. |
| 5,172,039 A | 12/1992 | Owens |
| 5,222,567 A | 6/1993 | Broadhead et al. |
| 5,226,501 A | 7/1993 | Takata |
| 5,234,066 A | 8/1993 | Ahsing et al. |
| 5,245,558 A | 9/1993 | Hachey |
| 5,248,007 A | 9/1993 | Watkins et al. |
| 5,253,724 A | 10/1993 | Prior |

(Continued)

FOREIGN PATENT DOCUMENTS

| | | |
|---|---|---|
| EP | 0 526 068 A1 | 2/1993 |
| EP | 0 590 674 A1 | 4/1994 |
| EP | 0 650 887 A2 | 5/1995 |
| EP | 0 675 037 A1 | 10/1995 |
| EP | 0 687 454 A1 | 12/1995 |
| EP | 0 756 856 A2 | 2/1997 |
| EP | 0 862 906 A1 | 9/1998 |
| EP | 0 925 771 A1 | 6/1999 |
| EP | 0 945 112 A1 | 9/1999 |
| EP | 0 964 232 A1 | 12/1999 |
| EP | 1 181 918 A1 | 2/2002 |
| EP | 0 687 454 B1 | 2/2003 |
| WO | WO 01/15962 A1 | 3/2001 |

OTHER PUBLICATIONS

European Search Report, EP 03 25 1256 dated Jun. 4, 2003.

*Primary Examiner*—David Porta
*Assistant Examiner*—Davienne Monbleau

(57) ABSTRACT

The relative position of two members is determined based upon a detected relative intensities of first and second colors of light. The intensity balance associated with relative occlusion of first and second color filter portions on one member by a mask on the other member. An exemplary use is in rotational position sensing within a limited rotation range. With a given compliance between the two members, the position sensing can be used as a proxy for torque sensing.

17 Claims, 2 Drawing Sheets

U.S. PATENT DOCUMENTS

| | | | |
|---|---|---|---|
| 5,270,624 | A | 12/1993 | Lautzenhiser |
| 5,274,311 | A | 12/1993 | Littlejohn et al. |
| 5,335,741 | A | 8/1994 | Rabinovitz et al. |
| 5,341,892 | A | 8/1994 | Hirose et al. |
| 5,356,172 | A | 10/1994 | Levy et al. |
| 5,366,037 | A | 11/1994 | Richey |
| 5,375,676 | A | 12/1994 | Takata et al. |
| 5,427,193 | A | 6/1995 | Avakian |
| 5,448,479 | A | 9/1995 | Kemner et al. |
| 5,497,056 | A | 3/1996 | Kurland et al. |
| 5,523,561 | A * | 6/1996 | Ironside et al. .......... 250/231.1 |
| 5,555,949 | A | 9/1996 | Stallard et al. |
| 5,565,856 | A | 10/1996 | Takaba et al. |
| 5,619,412 | A | 4/1997 | Hapka |
| 5,648,708 | A | 7/1997 | Littlejohn |
| 5,664,636 | A | 9/1997 | Ikuma et al. |
| 5,704,876 | A | 1/1998 | Baatz |
| 5,732,786 | A | 3/1998 | Fujigaki |
| 5,737,711 | A | 4/1998 | Abe |
| 5,763,874 | A * | 6/1998 | Luciano et al. ........ 250/231.14 |
| 5,788,007 | A | 8/1998 | Miekka |
| 5,798,702 | A | 8/1998 | Okamoto et al. |
| 5,818,189 | A | 10/1998 | Uchiyama et al. |
| 5,860,487 | A | 1/1999 | Tanaka et al. |
| 5,878,829 | A | 3/1999 | Kanno et al. |
| 5,927,414 | A | 7/1999 | Kan et al. |
| 5,988,661 | A | 11/1999 | Garfinkle |
| 6,003,627 | A | 12/1999 | Ishida |
| 6,011,640 | A * | 1/2000 | Hutton ...................... 359/234 |
| 6,015,021 | A | 1/2000 | Tanaka et al. |
| 6,059,060 | A | 5/2000 | Kanno et al. |
| 6,072,292 | A | 6/2000 | Uchiyama et al. |
| 6,092,615 | A | 7/2000 | Pusch et al. |
| 6,112,837 | A | 9/2000 | Kanno et al. |
| 6,115,367 | A | 9/2000 | Archambaud et al. |
| 6,140,636 | A * | 10/2000 | Norton et al. ......... 250/231.18 |
| 6,202,773 | B1 | 3/2001 | Richey, II et al. |
| 6,230,831 | B1 | 5/2001 | Ogata et al. |
| 6,232,594 | B1 * | 5/2001 | Eccher et al. .......... 250/231.14 |
| 6,302,226 | B1 | 10/2001 | Kanno et al. |
| 6,459,962 | B2 | 10/2002 | Ulrich et al. |
| 2001/0038452 | A1 * | 11/2001 | Beaumont .................. 356/416 |

\* cited by examiner

SENSOR

CROSS-REFERENCE TO RELATED APPLICATIONS

This patent application relates to a sensor technology which may be utilized in power-assist wheelchairs such as those shown in U.S. patent application Ser. No. 09/886,874 (the '874 application) entitled "POWER ASSIST VEHICLE" that was filed on Jun. 21, 2001, the disclosure of which is incorporated by reference in its entirety herein, and claims priority to 60/361,820, file date Mar. 4, 2002.

BACKGROUND OF THE INVENTION (1) Field of the Invention

This invention relates to position sensing, and more particularly to rotational position sensing within a restricted range.

(2) Description of the Related Art

Many torque sensing means exist including many optical sensors. Examples of optical sensors are given in U.S. Pat. Nos. 3,938,890, 4,502,681, 5,723,974, 5,907,106, 5,918,286, and 6,318,817.

BRIEF SUMMARY OF THE INVENTION

Relative angular position of first and second elements may be determined by detecting a balance between first and second colors of light passed from a source through a mask and a filter, one of which is substantially fixed relative to the first element and the other of which is substantially fixed relative to the second element. The balance is indicative of the relative orientation of the filter and mask and thus of the elements. The relative orientation of the elements may be indicative of a torque between the elements in view of a given compliance between the elements.

A key application is detecting the torque between a wheelchair handrim and its associated wheel. The sensor measures the deflection of the handrim relative to the wheel. A compliant coupling has the appropriate stiffness so the maximum angular deflection corresponds to the desired maximum torque. Most of the sensor is advantageously in the body of the chair, with minimal elements on the wheel/handrim. The sensor may allow the drive and sensing systems to be substantially independent. The sensor permits a small deflection or torque to be measured with no electrical connection between the body of the chair and the rotating wheel. By using an optical method to sense and transmit the data, the sensor may avoid the problems found in other non-contact methods including slip rings, radio links, inductive links, and/or capacitive links.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
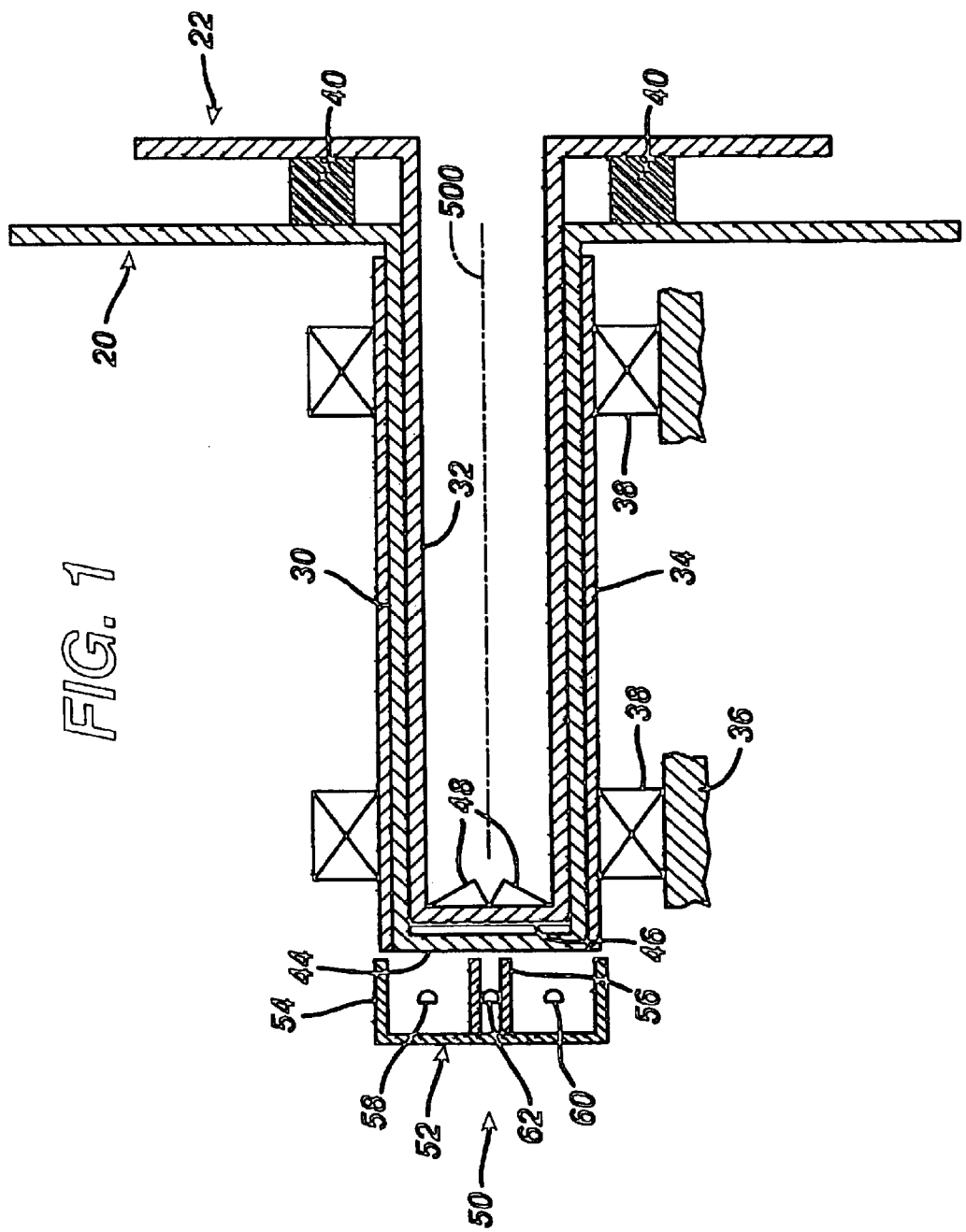
FIG. 1 is a schematic longitudinal sectional view of a sensor according to principles of the invention.

FIG. 1 shows a wheelchair drive wheel 20 and coaxial handrim 22. The wheel and handrim have concentric inner and outer hub tube portions 30 and 32 having a common axis 500. The wheel hub tube 30 is carried within a main drive tube 34. The drive tube 34 is held for rotation about the axis 500 relative to the body of the wheelchair (e.g., relative to the structural components 36 of a transmission unit) via bearings 38. The drive tube is coupled to a motor (not shown) to drive the wheel about the axis 500. Various non-illustrated details of the wheelchair, including control electronics and algorithms, may be similar to those disclosed in the '874 application. A quick release mechanism (not shown) permits the wheel and handrim assembly to be disengaged from the transmission unit via extraction of the wheel hub tube 30 from the drive tube 34. The wheel and handrim are rotationally coupled via a compliance 40 (e.g., an elastomer or a coil spring). Upon relative rotation of the handrim and wheel from an initial neutral orientation, the compliance produces an increasing resistive torque at least up until a substantially hard stop at each end of a restricted range of angular motion. An exemplary range is +/−1° from the neutral orientation. An exemplary peak measurable torque magnitude is 10–20 lb-ft at the hard stop. At its inboard end, the tube 30 carries a shadow mask 44 (described below).

At its own inboard end, the handrim hub tube 32 carries a color wheel 46 in close facing proximity to or contacting the shadow mask 44. Behind (outboard of) the color wheel 46, the handrim hub tube 32 carries a radially symmetric corner reflector 48 having an inboard-facing reflective surface. In a preferred embodiment, the reflector 48 is mounted to the outboard surface of the color wheel. The color wheel and shadow mask are advantageously as close as possible to minimize distortion without quite contacting each other so as to control wear and damage.

Figure 2:
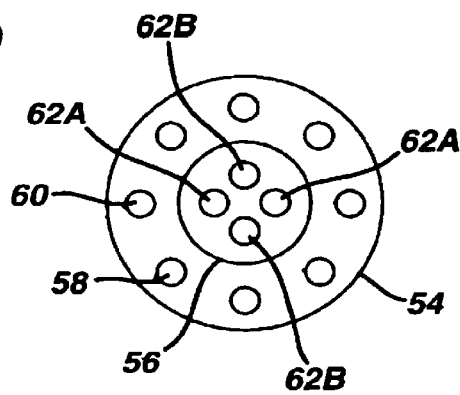
FIG. 2 is a semi-schematic open end view of a light source and photo detector cup of the sensor of FIG. 1.

Inboard of the shadow mask 44, the transmission unit carries a light source and sensor assembly 50. The exemplary assembly 50 comprises a cup-shaped housing 52 having outer and inner walls 54 and 56, respectively. Between the walls, the housing 52 carries a light source in the form of a plurality of green and red light emitting diodes (LEDs) 58 and 60. Within the wall 56 the housing carries a light sensor or photo detector in the form of a plurality of photodiodes 62. Shown in further detail in FIG. 2, the photodiodes 62 include photodiodes 62A having a preferential sensitivity for green light and photodiodes 62B having a preferential sensitivity for red light. The preferential sensitivity may be achieved via use photodiodes having particular chemistries sensitive to such light or via use of neutral photodiodes having filters which substantially filter all but green and red light, respectively. The LEDs are shielded from the photodiodes by the wall 56 acting as a baffle. LEDs make excellent sources for this application as they are monochromatic sources, are stable for a long time, and run cool (e.g., they draw about 75 milliwatts).

Figure 3A:
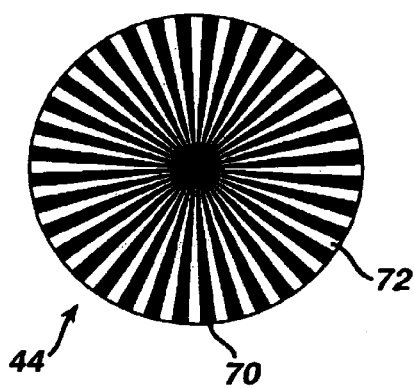
FIGS. 3A & B are respective plan views of the shadow mask and the color wheel of the sensor of FIG. 1.
Figure 3B:
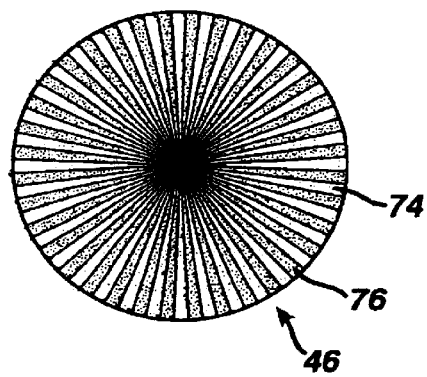

FIGS. 3A & B respectively show the shadow mask and the color wheel. The shadow mask has plurality of portions 70 substantially opaque to light in general (or at least to the two selected colors (red and green in the example)) and another plurality of portions 72 substantially transparent (or translucent) thereto. The exemplary portions are formed as alternating radially-extending sectors of a disk, each sector being of substantially identical circumferential span. Similarly, the color wheel 46 includes translucent or transparent portions, 74 and 76 which, respectively pass green and red light, filtering out other colors. For illustration the mask and wheel are shown with 5° segments. A preferred wheelchair encoder has 2° segments providing a 2° range (+/−1° from a center or neutral point) as described below.

Figure 4A:
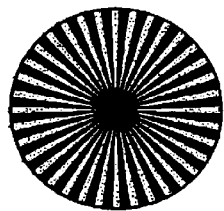
FIGS. 4A–C respectively show the superimposed mask and wheel with the wheel turned fully to the left, centered, and fully to the right.
Figure 4B:
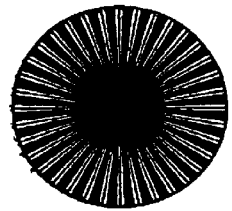
Figure 4C:
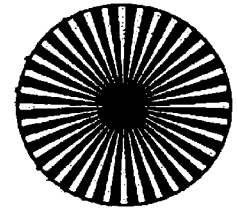

FIG. 4B shows the shadow mask and color wheel in superposition in a neutral orientation. In this orientation, the respective interfaces between the sectors of the two are offset from each other by half the angular pitch of the sectors. In this orientation, each opaque sector 70 occludes one half of each of an adjacent pair of green and red sectors 74 and 76 while each transparent sector 72 permits passage of light from one half of each of an adjacent pair of sectors 74 and 76. If substantially equal amounts of green and red light are projected through the superposed combination, and the wheel viewed in a sufficiently defocused manner, the net result is a perceived yellow color. If, from this neutral orientation, the wheel and mask are turned relative to each other by half of the pitch, the opaque sectors 70 will occlude only one group of the green or red sectors 74 and 76 while the transparent sectors 72 will pass light only from the other. Thus in FIG. 4A the relative rotation of is such that only red light may pass through the combination while in FIG. 4C it is rotated by the same amount in the opposite direction so that only green light may pass.

In operation, the color wheel rotates with the handrim and the shadow mask rotates with the drivewheel. Light from red and green LEDs initially travels outboard where it encounters the shadow mask. Both colors will pass through the portions 72 and be blocked by the portions 70 providing an initial 50% reduction in total passed light of the two colors. Passed light then encounters the portions 74 and 76, the respective colors of light passing only through their respective portions 74 and 76 to the extent such portions are not occluded. Depending on the angular displacement of the red/green color wheel relative to the shadow mask, the balance of red/green filtering changes. Thus the net proportion or balance of the two colors passed through the color wheel will depend on the relative displacement. After passing through the color wheel, the light is reflected by an outer portion of the reflector radially inward and then by a central portion back inboard. The reflected light then passes again through the color wheel and mask. Since there is the same degree of occlusion, this second pass does not affect the color balance although it does reduce the intensity. The light is then detected by the photodiodes 62, the balance of output of the green photodiodes 62A and red photodiodes 62B being indicative of the balance of light passed and, therefore, the direction and degree of rotation. To the eye, the color would change from red, to red-yellow, to yellow, to yellow-green, to green as the handrim moved from −1 degree to 1 degree. In view of the known compliance (whether linear or otherwise) the photodiodes' output may thus be used to determine the torque between the handrim and wheel.

The returned amount of light will be small. The photodiode outputs will be small so the amplifiers (not shown) will likely require very high gain. Electronics (not shown) are advantageously mounted with the sensor cup to reduce noise. Some type of optical gain (inexpensive lenses) could reduce the needed electrical gain.

The sensor should be very immune from electrical noise, and should radiate no EMI.

The system may have an analog output, appearing the same as the output from an instrumentation amplifier as used with a strain gauge, or could have a digital output.

The shadow mask and the color wheel can rotate as a unit relative to the wheelchair without changing the relative proportions of red and green light transmitted. If the intensity of the light source (but not its spectrum) changes, the red/green ratio does not change. The system would be fairly insensitive to changes in the transmission of light, so if the boundary between the drive unit and the wheel got a little dirty, the estimate of deflection would not change.

The entire sensing assembly can advantageously be removed from the drive (e.g., integrated motor/transmission unit) without opening the drive.

One or more embodiments of the present invention have been described. Nevertheless, it will be understood that various modifications may be made without departing from the spirit and scope of the invention. For example, modifications to the color wheel and shadow mask may be made. For example, one of the two passes through the portions 70, 72, 74, and 76 might be eliminated such as by providing apertures or additional transparent areas in the shadow mask and color wheel. This might help increase sensitivity. One could use other complementary colors, the receiver could be on the outside with the source on the inside, and one could also use a white light source. The drive wheel mounting arrangement may be such that a shaft protrudes from the gearbox onto which the wheel is placed, or that a shaft protrudes from the wheel and is inserted into the gearbox. One or more unfiltered photodiodes (sensitive to both color components) may be used by alternately illuminating the red and green LED's and measuring the photodiode output synchronously at very high speed (e.g., several kHz or more). Accordingly, other embodiments are within the scope of the following claims.

What is claimed is:

1. A device for sensing relative position or orientation of first and second members comprising
   a source of light having first and second color components;
   a filter having first and second portions respectively preferentially passing said first and second color components, and substantially fixed relative to the first member;
   a mask, having first and second portions respectively relatively transparent to and opaque to both said first and second color components, and substantially fixed relative to the second member; and
   a sensor for detecting the first and second color components, wherein:
   the mask and the filter are mounted along one or more light paths between the source and sensor; and
   a change in said position or orientation causes a varying relative occlusion of said first and second filter portions by said second mask portions so as to vary a relative proportion of said first and second color components detected by the sensor.

2. The device of claim 1 used to measure a force or torque between the first and second members in view of a compliance resisting said change in said position or orientation.

3. The device of claim 1 wherein:
   the combination of first and second members is carried by a third member;
   the source and sensor are mounted to the third member so that the combination may move relative to the source and sensor; and
   the device further includes a reflector carried by one of the first and second members and positioned so that the light path extends from the source to the sensor via the reflector and making at least one pass through the mask and filter.

4. The device of claim 3 wherein the light path makes two passes through the mask and filter.

5. The device of claim 1 wherein the first and second members are constrained so that the change in said position or orientation is substantially limited to relative rotation about an axis fixed relative to the first and second members.

6. The device of claim 5 wherein the first and second portions of the mask and filter are each alternating sectors of an annulus or disk.

7. The device of claim 1 wherein the source comprises one or more substantially discrete first sources of the first component and one or more substantially discrete second sources of the second component.

8. The device of claim 7 wherein the first and second sources are first and second light emitting diodes.

9. The device of claim 8 wherein first and second light emitting diodes are red and green, respectively.

10. The device of claim 1 wherein said sensor is sensitive to said first and second color components and said source is operated to alternatingly generate said first and second color components.

11. The device of claim 10 wherein there is a single photodiode synchronously sensing the first and second color components.

12. The device of claim 1 wherein said change in said position or orientation is substantially constrained by stops to be within a one-dimensional two-ended range.

13. The device of claim 12 wherein said one-dimensional two-ended range is a rotational range of between 0.5° and 10.0°.

14. The device of claim 12 wherein said one-dimensional two-ended range is a rotational range of between 1.0° and 3.0° and wherein a compliance tends to center the relative rotation within such range.

15. A wheelchair comprising:
a seat;
a frame;
left and right motors;
left and right drive wheels drivingly coupled to the left and right motors, respectively;
left and right hand rims concentric with and coupled to the left and right drive wheels, respectively;
left and right devices of claim 1 respectively associated with the left and right drive wheels wherein the first and second members are respective hub portions of the associated drive wheel and hand rim; and
a control system coupling the left device and motor and right device and motor so as to drive the left motor responsive to at least a torque sensed by the left device and drive the right motor responsive to at least a torque sensed by the right device.

16. A method for sensing a drive torque applied by a user to the handrim of a wheel chair comprising:
detecting a balance between first and second colors of light passed from a source through a mask and a filter, one of which is substantially fixed relative to the hand rim and the other of which is substantially fixed relative to a drive wheel associated with the hand rim, the relative orientation of the drive wheel and hand rim being indicative of said torque in view of a given compliance and the balance being indicative of the relative orientation of the filter and mask.

17. The method of claim 16 wherein:
the first and second colors are red and green;
the balance is relative to a neutral condition in which substantially equal amounts of red and green light are so passed; and
the detection has a range of no more than +/−2° from the neutral condition.

* * * * *